Figures 1, 2:
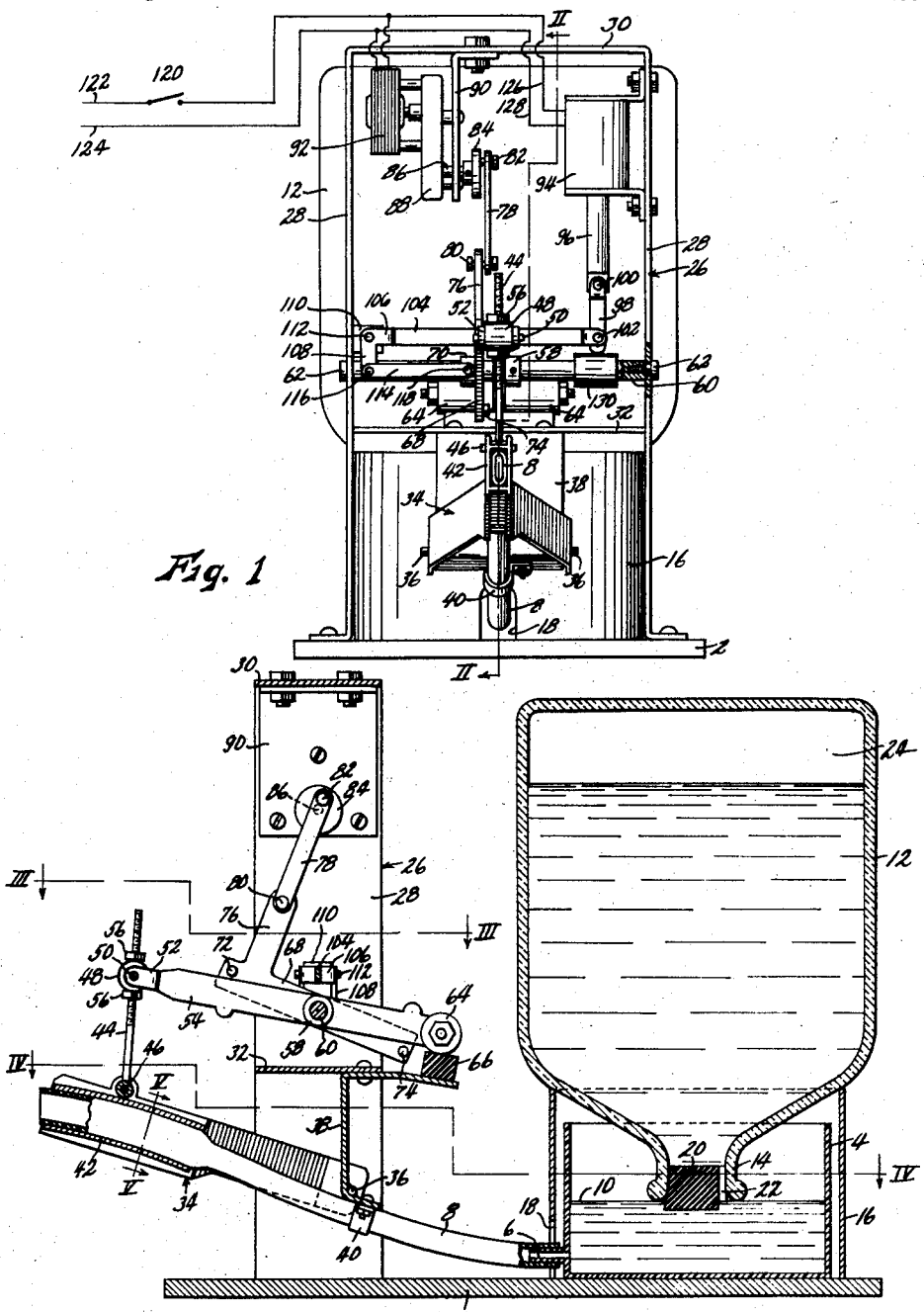

Aug. 16, 1960     O. E. WATSON     2,949,212
LIQUID FEEDER

Filed Aug. 11, 1958     2 Sheets-Sheet 1

INVENTOR.
Orla E. Watson
BY John A. Hamilton
Attorney.

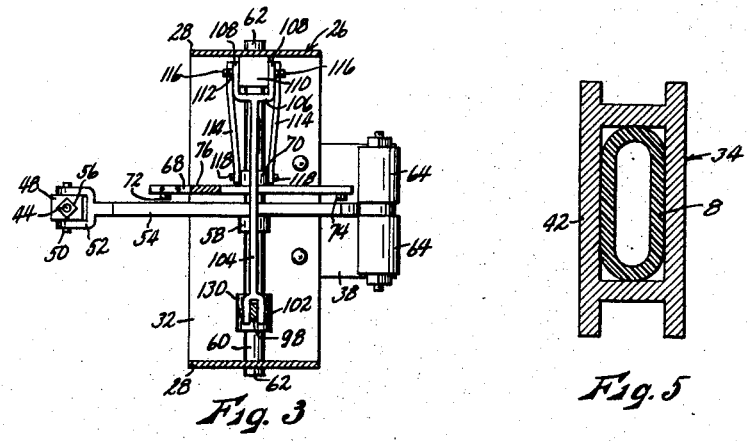

United States Patent Office 2,949,212
Patented Aug. 16, 1960

2,949,212

LIQUID FEEDER

Orla E. Watson, 2811 W. 67th St., Mission Hills, Kans.

Filed Aug. 11, 1958, Ser. No. 757,171

5 Claims. (Cl. 222—70)

This invention relates to new and useful improvements in liquid feeders, and has particular reference to devices adapted to feed liquid, especially in small quantities, from a container to its point of use, for example in adding chlorine to a swimming pool, or in a water treatment plant.

Important objects of the present invention are the provision of a liquid feeder of the class described which is capable of extremely small delivery rates, in which the delivery rate may be very closely adjusted, and in which the liquid being metered does not flow through any valve in the usual sense of the term, but contacts only its own container and a delivery tube, both of which may be made of glass, plastic, or other material capable of withstanding attack by chlorine, acid or other corrosive liquids which it may be desired to feed. Feeding apparatuses utilizing metallic valves are subject to frequent malfunctioning and necessity of repair when feeding corrosive liquids, due to deterioration of valve parts by the liquid itself.

These objects are accomplished generally by providing a container for the liquid to be fed and having a flexible outlet tube secured thereto below the liquid level therein, and power means operable when energized to oscillate the free end of said tube between positions respectively above and below said liquid level, a measured quantity of liquid flowing through and being discharged from said tube driving each oscillation. Other features include means for maintaining the liquid level in the container substantially uniform by feeding it from a reservoir, means operable to adjust the vertical limits of oscillation whereby to vary the amount of liquid discharged during each oscillation, and means operable automatically whenever said power means is de-energized to return the free end of said tube to its upper position above the container liquid level, whereby accidental stoppage of the device in a fluid-delivering position is positively prevented.

Other objects are simplicity and economy of construction, efficiency and dependability of operation, and adaptability for use in a wide variety of applications.

With these objects in view, as well as other objects which will appear in the course of the specification, reference will be had to the drawing, wherein:

Fig. 1 is a front elevational view of a liquid feeder embodying the present invention, shown partially diagrammatically, Fig. 2 is a slightly irregular sectional view taken on line II—II of Fig. 1, Figs. 3 and 4 are sectional views taken respectively on lines III—III and IV—IV of Fig. 2, and Fig. 5 is an enlarged sectional view taken on line V—V of Fig. 2.

Like reference numerals apply to similar parts throughout the several views, and the numeral 2 applies to a planar base on which is supported an open-topped container 4 preferably formed of glass, plastic or other corrosion resistant material. Said container is fitted with an outlet 6 adjacent its bottom, to which is attached a flexible tube 8 also formed of plastic or other corrosion resistant material, the other end of said tube being open. It will be apparent that when all parts of said tube are lowered below the liquid level 10 in container 4, liquid will flow through said tube by gravity and be discharged from the open end thereof for use as desired. Liquid is fed into container 4 from a reservoir 12 constituting a glass bottle or the like, which may be the container in which the liquid is purchased, said bottle being inverted and having its neck 14 depending within container 4. The actual weight of the bottle is supported by a hollow metal cylinder 16 resting on base 2, surrounding container 4 and extending thereabove, and having a window 18 formed therein for tube 8. The neck of bottle 12 is fitted with a suitable stopper 20 having a restricted groove 22 formed therein through which liquid may flow from the bottle to container 4. Liquid will rise in container 4 only until the level thereof rises to bottle neck 14, whereupon the bottle is sealed, a partial vacuum will form in the bottle in the space 24 above the liquid therein, and flow will cease. When liquid is drawn off from container 4 through tube 8 and level 10 in the container drops very slightly, an air bubble will rise through the bottle into space 24, and a small amount of liquid will flow through stopper groove 22 into the container, thereby maintaining level 10 substantially uniform. By making the stopper groove 22 of very small area as compared to the surface area of liquid level 10, any fluctuation of the liquid level is rendered very slight since the amount of liquid delivered to the container for each bubble rising through the bottle is quite small.

Affixed to base 2 adjacent container 4 is a frame 26 formed of sheet metal and being of inverted U-shape, having a pair of uprights 28 connected at their upper ends by a cross bar 30, and having a cross bar 32 extending horizontally between and affixed to said uprights below the midpoints thereof. Flexible tube 8 extends between uprights 28 below cross bar 32, and is supported by a carrier arm 34 pivoted at its rearward end to a pair of axles 36 welded or otherwise affixed to a bracket 38 depending from cross bar 32. Arm 34 extends forwardly, or in a direction away from container 4, and is pivotally movable in a vertical plane. Tube 8 is supported intermediate its ends by a clip 40 attached to bracket 38. The free end portion of tube 8 is inserted through a tube-like guide 42 carried at the free end of carrier arm 34, and extends entirely therethrough as shown. As best shown in Fig. 5, guide 42 is of vertically elongated rectangular cross-sectional contour, whereby tube 8 is somewhat flattened, for a purpose which will be fully set forth below.

A threaded link 44 is pivoted, as at 46, to carrier arm 34 adjacent the forward or free end thereof, and extends upwardly therefrom through a block 48 which is pivoted as at 50, on a horizontal axis, in a clevis 52 carried at the forward end of a rocker arm 54. Nuts 56 threaded on link 44 above and below block 48 permit said link, and carrier arm 34, to be adjusted vertically with respect to rocker arm 54. The rocker arm is provided intermediate its ends with a hub 58 which is affixed to an axle 60 which extends horizontally between frame uprights 28, and is attached to said uprights for oscillation about its axis as by shouldered screws 62. Atttached to the end of the rocker arm opposite clevis 52 are counter-weights 64 of sufficient mass to urge carrier arm 34 upwardly at all times to a position wherein the free end of tube 8 is disposed above the liquid level 10 in container 4. The counter-weights are normally supported by a cushion block 66 carried by a rearward extension of bracket 38.

A clutch arm 68 is mounted oscillatably on axle 60 closely adjacent and generally parallel to rocker arm 54, said clutch arm being provided at its midpoint with a hub 70 which is rotatable and longitudinally slidable on axle 60. The clutch arm is provided with a pair of transversely projecting pins 72 and 84 respectively adjacent the forward and rearward ends thereof, said pins extending toward rocker arm 54. Adjacent its forward end, clutch arm 68 is provided with an upward extension 76, to the upper end of which one end of a link 78 is pivoted as at 80. The opposite end of said link is pivoted eccentrically as at 82 to a disc 84 which is mounted on and rotatably driven by the output shaft 86 of a geared speed-reduction unit 88 which is in turn mounted on a bracket 90 depending from top cross bar 32 of frame 26. Said speed reducer is driven by a small electric motor 92 also carried by bracket 90.

Clutch arm 68 is moved longitudinally along axle 60 by a solenoid coil 94 mounted on one of frame uprights 28 in a vertical position. The armature 96 of said solenoid has a link 98 pivoted to the lower end thereof as at 100, and the opposite end of said link is pivoted, as at 102, to one end of a horizontally extending lever 104. Said lever extends across the frame just above and generally parallel to axle 60. At the end thereof opposite pivot 102, said lever is bifurcated to form a clevis 106. The arms 108 of said clevis are pivoted to a block 110 affixed to frame upright 28, on a horizontal axis transverse to axle 60, as on pivot pin 112 affixed in said block, and depend from pivot 112 to positions respectively in front of and behind axle 60. A link 114 is pivoted at one end to the lower end of each lever arm 108, as at 116. Links 114 extend along opposite sides of axle 60, and are pivoted, as at 118, to diametrically opposite sides of hub 70 of clutch arm 68.

Operation of the device is substantially as follows. When the power to motor 92 and solenoid coil 94 is off, solenoid armature 96 is urged downwardly by gravity, acting through link 98, lever 104 and links 114 to pull clutch arm 68 to the left as viewed in Fig. 1, whereby to disengage pins 72 and 74 of said clutch arm from rocker arm 54. The rocker arm is thereupon tilted by counterweights 64 to elevate carrier arm 34 to maintain the open end of tube 8 above the liquid level 10 in container 4, and no liquid flows through said tube. When motor 92 is energized by closing a switch 120 in line wires 122 and 124 feeding said motor, the motor functions through speed reducer 88, eccentric 84 and link 78 to cause clutch arm 68 to oscillate about axle 60. At the same time solenoid coil 94 is energized since it is connected in parallel with motor 92 by wires 126 and 128. Solenoid armature 96, thus urged upwardly, acts through link 98, lever 104 and links 114 to urge clutch arm 68 to the right as viewed in Fig. 1, or toward rocker arm 54, thereby urging pins 72 and 74 against the flat surface of said rocker arm. When the clutch arm is at the top of its oscillatory movement, pins 72 and 74 thereof will be disposed respectively above the upper edge and below the lower edge of the rocker arm, as shown in Fig. 2, and a slight additional movement of the solenoid armature will cause said pins to move into overlapping engagement with the upper and lower edges, of the rocker arm. Thereafter, so long as the motor and solenoid are energized, the oscillatory movement of the clutch arm will be transmitted by pins 82 and 74 to rocker arm 54, and will be transmitted from the rocker arm to carrier arm 34 by link 44. Vertical oscillation of carrier arm 34 will raise and lower tube 8 alternately between positions above and below the liquid level 10 in container 4. During the lower portion of each oscillation of the carrier arm, at least a portion of the cross-sectional area of the tube, along the full length thereof, will be moved below liquid level, and liquid will flow through said tube by gravity and be discharged from the open end thereof for use as desired. When it is desired to cease operations, switch 120 is opened, thereby stopping motor 92 and de-energizing solenoid coil 94. De-energizing the solenoid permits armature 96 to drop, its fall being cushioned by a bumper 130 comprising a section of thick rubber tube surrounding axle 60 and engaged by the lower end of link 98. Dropping of the armature acts through lever 104 and links 114 to disengage clutch pins 72 and 74 from rocker arm 54, and the rocker arm is then pivoted by weights 64 to move tube 8 to its elevated position. Accidental stoppage of the machine in a fluid-delivering position is thereby positively prevented. If the device is being used to feed a treating chemical into a flowing stream of water, for example, and said water is being circulated or impelled by a pump, it will be advantageous also to connect motor 92 and solenoid 94 in parallel with the motor operating said pump. The pivotal connections 80 and 82 of link 78 are sufficiently free so as not to interfere with the movement of clutch arm 68 longitudinally along axle 60, and the pivotal connections 116 and 118 of links 114 are sufficiently loose not to interfere with the oscillatory pivotal movement of said clutch arm.

The flow rate provided by this feeder may be adjusted by loosening and turning nuts 56 on link 44 to adjust the effective length of said link, whereby to increase or decrease the distance that tube 8 will be lowered below liquid level 10. This of course changes not only the flow area, but also the proportion of each period of oscillation that said flow area will be open. The adjustment provided by nuts 56 is extremely accurate, and will be maintained throughout long periods of operation due to the fact that liquid level 10 is maintained constant by the "drinking fountain" feed from reservoir 12. The flattening of the end portion of tube 8, as shown in Fig. 5, provides that the flow area will be increased in substantially equal increments as the lower limit of tube oscillation is lowered in equal movements by increasing the length of link 44. This feature renders adjustment of the delivery rate both easier and more convenient.

The use of a carrier which oscillates constantly, as distinguished from a mechanism which simply lowers the tube to establish liquid flow and maintains it in said lowered position as long as operation continues, is considered to provide several advantages. Firstly, it permits adjustment of the device to much lower delivery rates, since the flow occurs only during a small portion of each oscillation. The mechanism as shown is easily adjustable to deliver as little as three or four drops of liquid for each oscillation of the carrier. Secondly, on low delivery rates, the oscillation provides that the flow rate during actual flow may be greater than a constant flow producing the same delivery rate, due to the intermittent character of the flow. The greater flow rate tends to keep the tube flushed out and to prevent partial or complete stoppage thereof by sediment, foreign matter or encrustations commonly encountered when handling certain types of liquids. Thirdly, the oscillation produces a certain amount of "sloshing" or turbulence of liquid in the tube, and this further tends to prevent the collection of sediment, etc., as mentioned above.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A liquid feeder comprising a base, a liquid container carried by said base, a flexible tube interconnected at its one end to said container below the liquid level therein and being open at its opposite end, a frame carried by said base, a carrier member supported on said frame and normally supporting a portion of said tube in an elevated position above said liquid level, whereby flow of liquid through said tube is prevented, said carrier being movable relative to said frame to a lowered position in which the normally elevated portion of said tube is disposed below said liquid level whereby liquid flows through said tube and is discharged from the open end thereof by gravity, and actuating means carried by said frame and which when energized oscillates said carrier and tube regularly between their elevated position and their lowered position, whereby liquid flows through said tube during only a portion of each oscillation.

2. A liquid feeder as recited in claim 1 wherein said actuating means whenever it is de-energized returns said carrier and tube automatically to their elevated position.

3. A liquid feeder as recited in claim 1 wherein said actuating means includes an electric motor and power connection means between said motor and said carrier for oscillating said carrier and tube between their elevated and lowered positions whenever said motor is energized.

4. A liquid feeder as recited in claim 1 with the addition of means biasing said carrier and tube at all times toward their elevated position, and wherein said actuating means includes an electric motor, power connection means between said motor and said carrier for oscillating said carrier and said tube between their elevated and lowered positions whenever said motor is energized, a normally disengaged clutch disposed in said power connection means, and electric means for engaging said clutch whenever said electric means is energized.

5. A liquid feeder as recited in claim 4 wherein said motor and said electric clutch engaging means are connected in a common electric circuit whereby to be energized simultaneously whenever said circuit is closed.

References Cited in the file of this patent

UNITED STATES PATENTS

| | | |
|---|---|---|
| 1,077,870 | Choate | Nov. 4, 1913 |
| 1,225,977 | Ledoux | May 15, 1917 |